(12) United States Patent  
Miyakawa

(10) Patent No.: US 11,856,298 B2  
(45) Date of Patent: Dec. 26, 2023

(54) IMAGE PROCESSING METHOD, IMAGE PROCESSING DEVICE, IMAGE PROCESSING SYSTEM, AND PROGRAM

(71) Applicant: NIPPON TELEGRAPH AND TELEPHONE CORPORATION, Tokyo (JP)

(72) Inventor: Kazu Miyakawa, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 92 days.

(21) Appl. No.: 17/615,809

(22) PCT Filed: Jun. 4, 2019

(86) PCT No.: PCT/JP2019/022226  
§ 371 (c)(1),  
(2) Date: Dec. 1, 2021

(87) PCT Pub. No.: WO2020/245927  
PCT Pub. Date: Dec. 10, 2020

(65) Prior Publication Data  
US 2022/0329730 A1    Oct. 13, 2022

(51) Int. Cl.  
*H04N 23/698* (2023.01)  
*G06T 7/246* (2017.01)  
*G06T 5/00* (2006.01)  
*G06T 5/50* (2006.01)

(52) U.S. Cl.  
CPC .......... *H04N 23/698* (2023.01); *G06T 5/001* (2013.01); *G06T 5/50* (2013.01); *G06T 7/248* (2017.01); *G06T 2207/10032* (2013.01)

(58) Field of Classification Search  
CPC ............. H04N 23/698; H04N 23/6811; H04N 23/683; H04N 23/951; H04N 5/2628; G06T 5/001; G06T 5/50; G06T 7/248; G06T 2207/10032; G06T 3/4038  
See application file for complete search history.

(56) References Cited

U.S. PATENT DOCUMENTS 10,165,186 B1 * 12/2018 Brailovskiy ......... H04N 23/683

OTHER PUBLICATIONS

Nippon Telegraph and Telephone Corporation (1999) "Ultra-wide video composition technology" [online] Accessed on Apr. 4, 2019 (ReadingDay) website: http://www.ntt.co.jp/svlab/activity/pickup/qa53.html.

* cited by examiner

*Primary Examiner* — Farzana Hossain

(57) ABSTRACT

An image processing method according to the present invention includes the steps of acquiring a first frame image and a second frame image, determining, based on a difference between the first frame image at a first time and the second frame image at the first time, whether or not a deviation has occurred therebetween, calculating a correction value based on an amount of deviation when it has been determined that a deviation has occurred, correcting the first frame image and the second frame image at the first time based on the correction value, and synthesizing the corrected first frame image and the corrected second frame image.

20 Claims, 4 Drawing Sheets

IMAGE PROCESSING METHOD, IMAGE PROCESSING DEVICE, IMAGE PROCESSING SYSTEM, AND PROGRAM

CROSS-REFERENCE TO RELATED APPLICATIONS

This application is a U.S. National Stage Application filed under 35 U.S.C. § 371 claiming priority to International Patent Application No. PCT/JP2019/022226, filed on 4 Jun. 2019, the disclosure of which is hereby incorporated herein by reference in its entirety.

TECHNICAL FIELD

The present invention relates to an image processing method, an image processing apparatus, an image processing system, and a program for synthesizing frame images captured by cameras mounted on an unmanned aerial vehicle.

BACKGROUND ART

With miniaturization, improvement in accuracy, and increase in battery capacity of equipment, live streaming using small cameras such as action cameras has been actively performed. Such small cameras often use an ultra-wide-angle lens having a horizontal viewing angle of more than 120°. Using an ultra-wide-angle lens enables capturing of an image over a wide range (a highly realistic panoramic image) with a sense of realism. Meanwhile, an ultra-wide-angle lens causes loss of a large amount of information due to peripheral distortion of the lens and deterioration of image quality such as the image becoming rougher toward the periphery of the image because a single lens encompasses information of a wide range.

It is difficult to capture a highly realistic panoramic image with a single camera as described above. Thus, a technique that combines images captured by a plurality of high-definition cameras to allow an image appear as if a landscape has been shot with one camera has been developed (see Non Patent Literature 1).

In the technique described in Non Patent Literature 1, each camera has a lens encompassing a certain range narrower than that of a wide-angle lens. A panoramic image obtained by synthesizing images captured by the cameras has high definition in every corner in contrast to when a wide-angle lens is used.

In such panoramic image synthesis, a plurality of cameras shoot in different directions with a certain point as the center. When synthesizing images of the cameras into a panoramic image, projective transformation (homography) is performed using the mappings of feature points between frame images. The projective transformation is a transformation which moves one quadrangle (plane) to another quadrangle (plane) while maintaining the straightness of the sides of the quadrangle. Transformation parameters for performing the projective transformation are estimated using a plurality of mappings, each from a feature point to a feature point. Performing projective transformation using the transformation parameters removes distortion due to the orientations of the cameras in the frame image group, allows a group of frame images to be projected onto one plane as if they were shot with one lens, and enables synthesis without a sense of incongruity (see FIG. 1).

On the other hand, if transformation parameters are not estimated correctly due to an error in the mapping of the feature points or the like, a deviation occurs between the frame images of the cameras, strange lines appear at the joins, or inconsistencies occur in the image. Therefore, panoramic shooting with a plurality of cameras is generally performed with a group of cameras grounded and firmly fixed.

CITATION LIST

Non Patent Literature

Non Patent Literature 1: "Ultra-wide video synthesis technology," [online], [retrieved on May 27, 2019], Internet <URL: http://www.ntt.co.jp/svlab/activity/pickup/qa53.html>

SUMMARY OF THE INVENTION

Technical Problem

Small unmanned aerial vehicles (UAVs) of about several kilograms have become widely used in recent years. For example, shooting with small cameras mounted on unmanned aerial vehicles has become common. Unmanned aerial vehicles have a feature that they can easily shoot in various places because they are small.

Because shooting with an unmanned aerial vehicle is expected to be used for public interest purposes such as quick information gathering in disaster areas, it is desirable to capture an image over a wide range with as high a definition as possible. Thus, there is a demand for a technique for capturing a highly realistic panoramic image using a plurality of cameras as described in Non Patent Literature 1.

Unmanned aerial vehicles vibrate slightly due to disturbances such as gusts, delays or errors during motor control, or the like although they try to maintain their position stably by using advanced motor control techniques, positioning techniques, or the like. A gimbal mechanism is often used as a device that absorbs such vibrations.

A gimbal is a type of rotating support that allows rotation of an object about a single axis. If a plurality of gimbals are attached such that their rotation axes are orthogonal to each other, the internal axis is not affected by external rotation. In particular, when the three axes cross at right angles, the internal axis is not affected by any external rotation. Gimbals on which cameras are mounted are called gimbal heads and are used in many unmanned aerial vehicles that shoot with cameras.

A gimbal head used in an unmanned aerial vehicle is premised on mounting of a single camera and is adjusted such that its center of gravity coincides with the intersection of the axes. This adjustment allows the gimbal to be stably fix the position of the camera, and providing a motor on the axis facilitates attitude control of the camera.

On the other hand, when a plurality of cameras are mounted on a gimbal, it is difficult to hold the center of gravity of the gimbal head in place and the moment during rotation is great because the plurality of cameras face different directions or are arranged horizontally. Thus, the gimbal may not be able to sufficiently absorb vibrations of the unmanned aerial vehicle. In this case, a deviation occurs between frame images due to vibrations generated in the cameras, and as described above, strange lines or image inconsistencies occur at the joins. To limit the deviation between the frame images, it is necessary to firmly fix the camera group. However, an increase in weight due to the fixing equipment or the like increases the moment and it becomes difficult for the gimbal to quickly absorb vibrations. When attitude control is performed using a motor, the motor may oscillate due to an increase in the moment, resulting in an uncontrollable state. It may not be possible to firmly fix the camera group in the first place due to weight because there is a set weight that can be mounted on a gimbal or an unmanned aerial vehicle.

An object of the present invention which has been made in view of the above problems is to provide an image processing method, an image processing apparatus, an image processing system, a program which can generate a highly accurate panoramic image without firmly fixing a plurality of cameras mounted on an unmanned aerial vehicle.

Means for Solving the Problem

An image processing method according to the present invention to solve the above problems is an image processing method of synthesizing frame images captured by a plurality of cameras mounted on an unmanned aerial vehicle, the image processing method including acquiring a first frame image captured by a first camera and a second frame image captured by a second camera, determining whether or not a deviation has occurred between the first frame image at a first time and the second frame image at the first time based on a difference between the first frame image at the first time and the second frame image at the first time, calculating a correction value based on an amount of deviation of the second frame image at the first time with respect to the first frame image at the first time when it has been determined in the determining that the deviation has occurred, correcting the first frame image and the second frame image at the first time based on the correction value, and synthesizing the corrected first frame image and the corrected second frame image.

An image processing apparatus according to the present invention to solve the above problems is an image processing apparatus configured to synthesize frame images captured by a plurality of cameras mounted on an unmanned aerial vehicle, the image processing apparatus including a deviation determination unit configured to determine whether or not a deviation has occurred between a first frame image captured by a first camera at a first time and a second frame image captured by a second camera at the first time based on a difference between the first frame image at the first time and the second frame image at the first time, a correction value calculation unit configured to calculate a correction value based on an amount of deviation of the second frame image at the first time with respect to the first frame image at the first time when the deviation determination unit has determined that the deviation has occurred, a frame image correction unit configured to correct the first frame image and the second frame image at the first time based on the correction value, and a frame image correction unit synthesis unit configured to synthesize the corrected first frame image and the corrected second frame image.

An image processing system according to the present invention to solve the above problems is an image processing system configured to synthesize frame images captured by a plurality of cameras mounted on an unmanned aerial vehicle, the image processing system including a frame image acquisition unit configured to acquire a first frame image captured by a first camera and a second frame image captured by a second camera, a deviation determination unit configured to determine whether or not a deviation has occurred between the first frame image at a first time and the second frame image at the first time based on a difference between the first frame image at the first time and the second frame image at the first time, a correction value calculation unit configured to calculate a correction value based on an amount of deviation of the second frame image at the first time with respect to the first frame image at the first time when the deviation determination unit has determined that the deviation has occurred, a frame image correction unit configured to correct the first frame image and the second frame image at the first time based on the correction value, and a frame image synthesis unit configured to synthesize the corrected first frame image and the corrected second frame image.

To solve the above problems, a program according to the present invention causes a computer to function as the above image processing apparatus.

Effects of the Invention

According to the image processing method, the image processing apparatus, the image processing system, and the program according to the present invention, it is possible to generate a highly accurate panoramic image without firmly fixing a plurality of cameras mounted on an unmanned aerial vehicle.

DESCRIPTION OF EMBODIMENTS

Hereinafter, embodiments for carrying out the present invention will be described with reference to the drawings.

Configuration of Image Processing System

Figure 1:
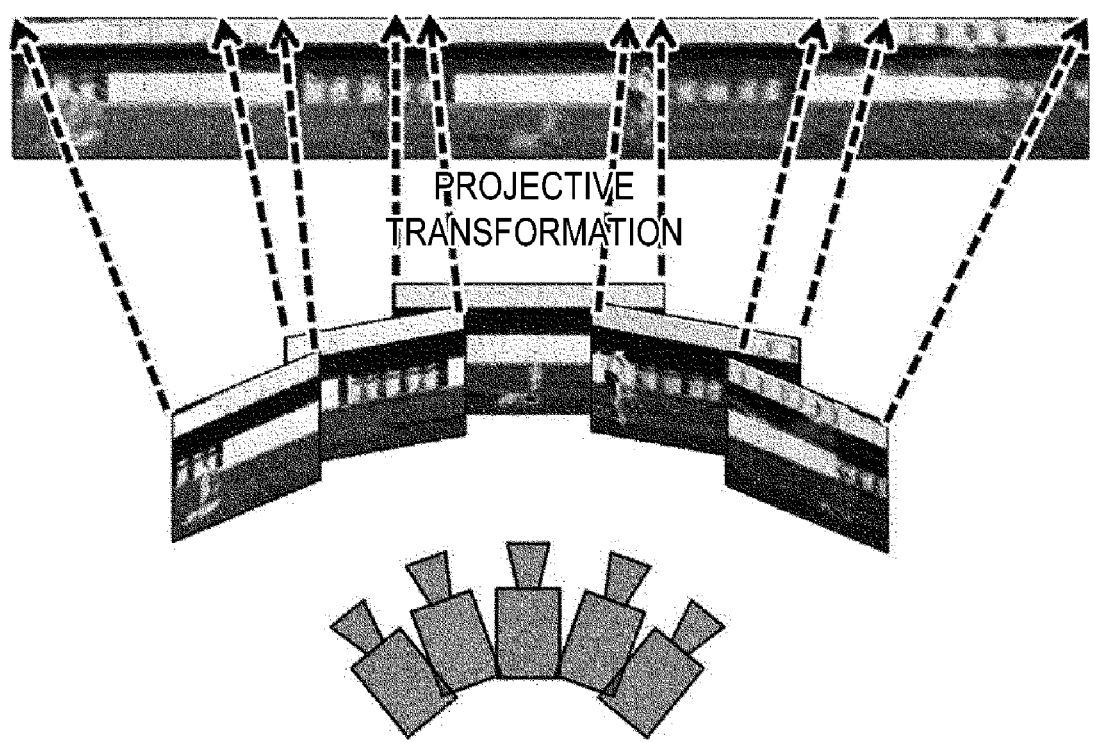
FIG. 1 is a diagram for explaining synthesis of frame images through projective transformation.
Figure 2:
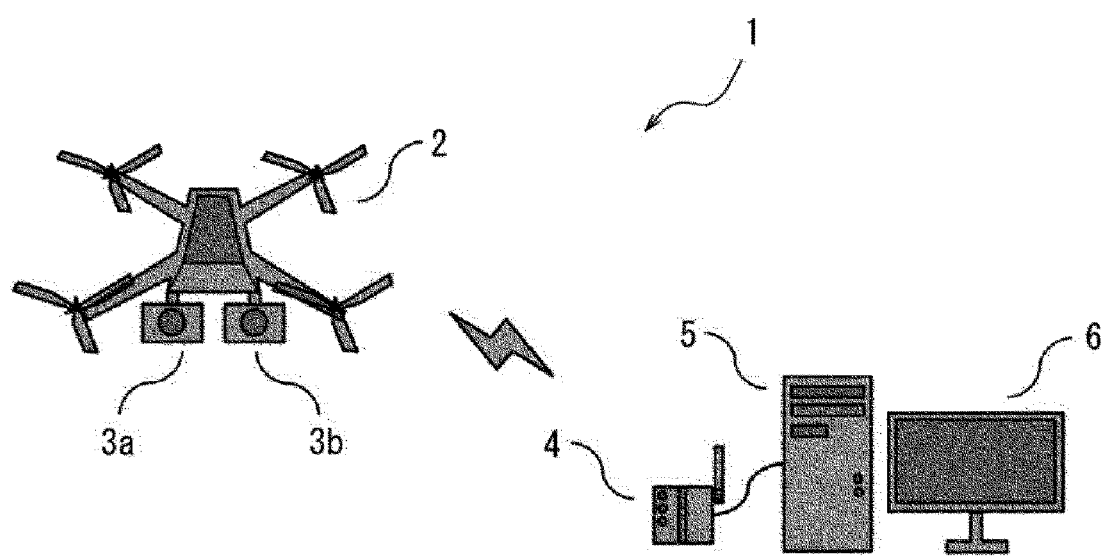
FIG. 2 is a diagram illustrating an exemplary configuration of a panoramic image synthesis system according to an embodiment of the present invention.

FIG. 2 is a diagram illustrating an exemplary configuration of a panoramic image synthesis system (image processing system) 1 according to an embodiment of the present invention.

The panoramic image synthesis system 1 illustrated in FIG. 2 includes an unmanned aerial vehicle 2, a plurality of cameras 3 (two cameras 3a and 3b in FIG. 2), a wireless receiving unit 4, a computing device (image processing apparatus) 5, and a display device 6. The panoramic image synthesis system 1 according to the present embodiment synthesizes frame images captured by the camera (first camera) 3a and the camera (second camera) 3b mounted on the unmanned aerial vehicle 2 to generate a highly realistic panoramic image.

The unmanned aerial vehicle 2 is a small unmanned aircraft that weighs about several kilograms and has the cameras 3a and 3b mounted thereon.

The cameras 3a and 3b shoot in different directions. Image data of images captured by the cameras 3a and 3b is wirelessly transmitted from the unmanned aerial vehicle 2 to the wireless receiving device 4. The present embodiment will be described with reference to an example in which the two cameras 3a and 3b are mounted on the unmanned aerial vehicle 2, but three or more cameras 3 may be mounted on the unmanned aerial vehicle 2.

The wireless receiving device 4 receives the image data of the images captured by the cameras 3a and 3b wirelessly transmitted from the unmanned aerial vehicle 2 in real time and outputs the image data to the computing device 5. The wireless receiving device 4 is a general wireless communication device having a function of receiving wirelessly transmitted signals.

The computing device 5 synthesizes the images captured by the cameras 3a and 3b shown in the image data received by the wireless receiving device 4 to generate a highly realistic panoramic image.

The display device 6 displays the highly realistic panoramic image generated by the computing device 5.

Next, the configurations of the unmanned aerial vehicle 2, the wireless receiving device 4, the computing device 5, and the display device 6 will be described with reference to FIG. 3.

First, the configuration of the unmanned aerial vehicle 2 will be described.

Figure 3:
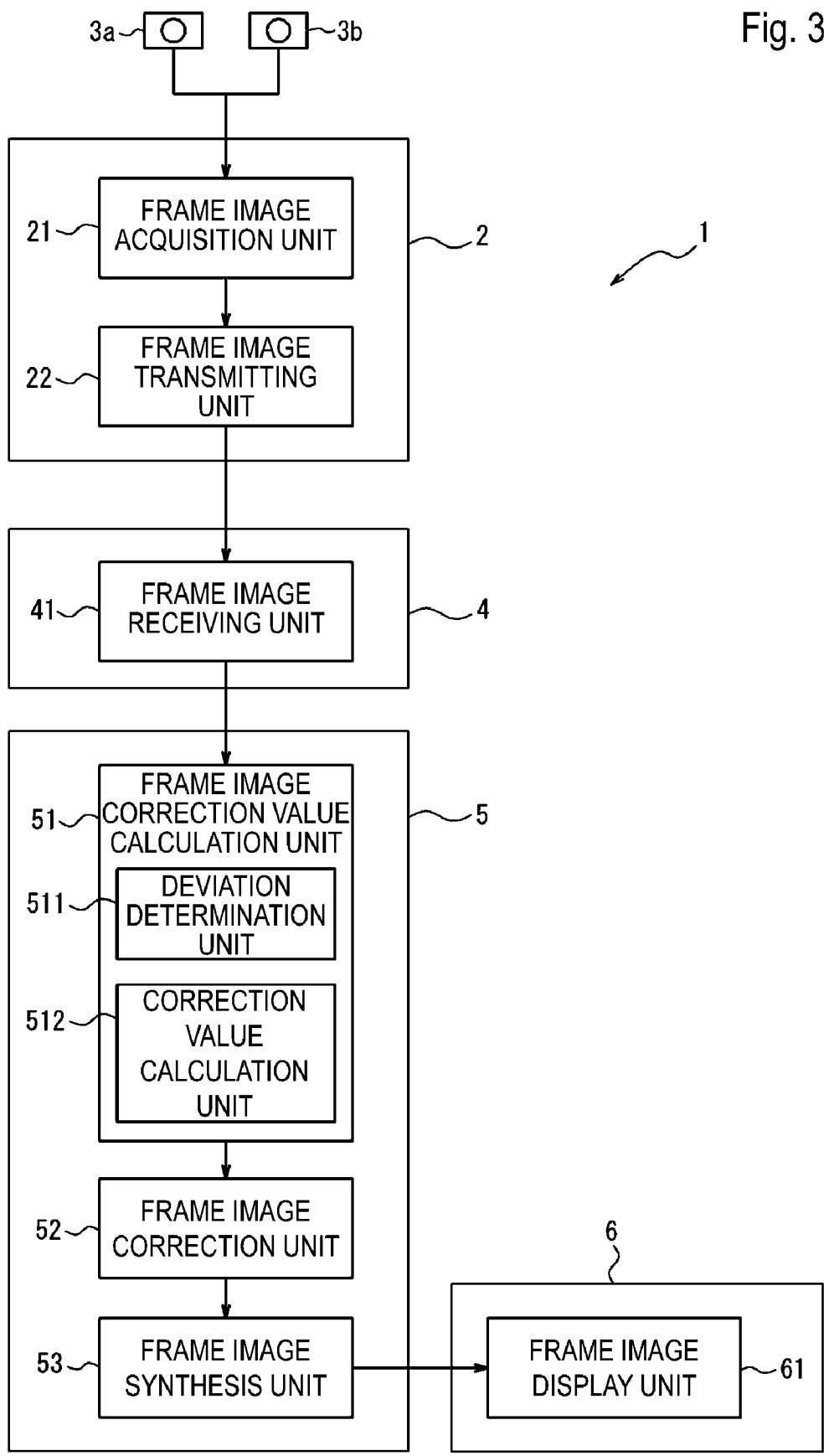
FIG. 3 is a block diagram illustrating an exemplary configuration of a panoramic image synthesis system according to an embodiment of the present invention.

As illustrated in FIG. 3, the unmanned aerial vehicle 2 includes a frame image acquisition unit 21 and a frame image transmitting unit 22. Note that, of the components of the unmanned aerial vehicle 2, only those particularly related to the present invention are shown in FIG. 3, and for example, components for flight of the unmanned aerial vehicle 2 are omitted.

The frame image acquisition unit 21 acquires a frame image $f_t^{3a}$ (a first frame image) captured by the camera 3a and a frame image $f_t^{3b}$ (a second frame image) captured by the camera 3b at time t (first time) and outputs the acquired frame images $f_t^{3a}$ and $f_t^{3b}$ to the frame image transmitting unit 22. The frame image acquisition unit 21 also acquires a frame image $f_{t-1}^{3a}$ captured by the camera 3a and a frame image $f_{t-1}^{3b}$ captured by the camera 3b at time t−1 (second time) which is prior to the time t and outputs the acquired frame images $f_{t-1}^{3a}$ and $f_{t-1}^{3b}$ to the frame image transmitting unit 22.

The frame image transmitting unit 22 wirelessly transmits the frame images $f_t^{3a}$ and $f_t^{3b}$ input from the frame image acquisition unit 21 to the wireless reception device 4. The frame image transmitting unit 22 also wirelessly transmits the frame images $f_{t-1}^{3a}$ and $f_{t-1}^{3b}$ input from the frame image acquisition unit 21 to the wireless reception device 4. While the present embodiment has been described with reference to the case where the frame image transmitting unit 22 wirelessly transmits various frame images to the wireless receiving device 4 as an example, the frame image transmitting unit 22 may also transmit various frame images to the computing device 5 via a cable or the like.

Next, the configuration of the wireless receiving device 4 will be described. The wireless receiving device 4 includes a frame image receiving unit 41.

The frame image receiving unit 41 receives the frame images $f_t^{3a}$ and $f_t^{3b}$ wirelessly transmitted from the unmanned aerial vehicle 2. The frame image receiving unit 41 also receives the frame images $f_{t-1}^{3a}$ and $f_{t-1}^{3b}$ transmitted from the unmanned aerial vehicle 2. The frame image receiving unit 41 transmits the frame images $f_t^{3a}$ and $f_t^{3b}$ and the frame images $f_{t-1}^{3a}$ and $f_{t-1}^{3b}$ to the computing device 5.

Next, the configuration of the computing device 5 will be described.

As illustrated in FIG. 3, the computing device 5 includes a frame image correction value calculation unit 51, a frame image correction unit 52, and a frame image synthesis unit 53. Each function of the frame image correction value calculation unit 51, the frame image correction unit 52, and the frame image synthesis unit 53 can be implemented by a processor or the like executing a program stored in a memory of the computing device 5. In the present embodiment, the "memory" is, for example but not limited to, a semiconductor memory, a magnetic memory, or an optical memory. Also, in the present embodiment, the "processor" is, for example but not limited to, a general-purpose processor or a processor specialized in specific processing.

The frame image correction value calculation unit 51 includes a deviation determination unit 511 and a correction value calculation unit 512. The frame image correction value calculation unit 51 acquires the frame images $f_t^{3a}$ and $f_t^{3b}$ and the frame images $f_{t-1}^{3a}$ and $f_{t-1}^{3b}$ input from the wireless receiving device 4. The frame image correction value calculation unit 51 calculates correction values $C_t^{3a}$ and $C_t^{3b}$ for correcting the frame images $f_t^{3a}$ and $f_t^{3b}$ and outputs the calculated correction values $C_t^{3a}$ and $C_t^{3b}$ to the frame image correction unit 52.

The deviation determination unit 511 determines whether or not a deviation has occurred between the frame images $f_t^{3a}$ and $f_t^{3b}$. The deviation determination unit 511 outputs the determination result to the correction value calculation unit 512.

Specifically, first, the deviation determination unit 511 determines whether or not a deviation has occurred between the frame images $f_t^{3a}$ and $f_t^{3b}$ based on the frame images $f_t^{3a}$ and $f_t^{3b}$ input from the wireless receiving device 4. The deviation determination unit 511 calculates an average value A of differences between the pixel values of corresponding pixels in overlapping images $d_t^{3a}$ and $d_t^{3b}$ of the frame images $f_t^{3a}$ and $f_t^{3b}$. An overlapping image which is a part of the frame image $f_t^{3a}$ can be represented as an overlapping image $d_t^{3a}$. An overlapping image which is a part of the frame image $f_t^{3b}$ can be represented as an overlapping image $d_t^{3b}$. Normally, when a panoramic image is generated, the frame image $f_t^{3a}$ and the frame image $f_t^{3b}$ are overlapped to a certain extent (for example, about 20%) in order to estimate transformation parameters required for the projective transformation described above. The average value A can be represented by the following equation (1).

[Math. 1]

$$A = \sum \frac{(p_{t,i}^{3b} - p_{t,i}^{3a})}{N} \tag{1}$$

Here, i represents the position of each pixel. N represents the number of pixels. $p_{t,i}^{3a}$ represents the pixel value of each pixel included in the overlapping image $d_t^{3a}$ which is a part of the frame image $f_t^{3a}$. $p_{t,i}^{3b}$ represents the pixel value of each pixel included in the overlapping image $d_t^{3b}$ which is a part of the frame image $f_t^{3b}$.

The deviation determination unit 511 determines whether or not the average value A is greater than a first threshold value $p_{1\_thre}$ and smaller than a second threshold value $p_{u\_thre}$ using the following expression (2). When the average value A is greater than the first threshold value $p_{1\_thre}$ and smaller than the second threshold value $p_{u\_thre}$, the deviation determination unit 511 determines that it is an uncertain state. The uncertain state refers to a state in which the deviation determination unit 511 cannot reliably determine whether or not a deviation has occurred between the frame images $f_t^{3a}$ and $f_t^{3b}$.

[Math. 2]

$$p_{u\_thre} > \sum \frac{(p_{t,i}^{3b} - p_{t,i}^{3a})}{N} > p_{l\_thre} \quad (2)$$

When the average value A is equal to or less than the first threshold value $p_{l\_thre}$, the deviation determination unit 511 determines that no deviation has occurred between the frame images $f_t^{3a}$ and $f_t^{3b}$. The first threshold value $p_{l\_thre}$ is a preset lower limit threshold value for determining that certainly no deviation has occurred between the frame images $f_t^{3a}$ and $f_t^{3b}$. On the other hand, when the average value A is equal to or greater than the second threshold value $p_{u\_thre}$, the deviation determination unit 511 determines that a deviation has occurred between the frame images $f_t^{3a}$ and $f_t^{3b}$. The second threshold value $p_{u\_thre}$ is a preset upper limit threshold value for determining that certainly a deviation has occurred between the frame images $f_t^{3a}$ and $f_t^{3b}$.

The first and second threshold values $p_{l\_thre}$ and $p_{u\_thre}$ are arbitrarily set values, but have a relationship of second threshold value $p_{u\_thre}$>first threshold value $p_{l\_thre}$.

When no deviation has occurred between the overlapping images $d_t^{3a}$ and $d_t^{3b}$, the number of matches between the pixel values $p_{t,i}^{3a}$ included in the overlapping image $d_t^{3a}$ and the pixel values $p_{t,i}^{3b}$ included in the overlapping image $d_t^{3b}$ is great. When a panoramic image is generated, the plurality of cameras shoot in different directions with a certain point as the center, such that the overlapping images $d_t^{3a}$ and $d_t^{3b}$ do not completely match. Thus, the deviation determination unit 511 determines whether or not the average value A comes within a predetermined range using two threshold values (the first and second threshold values $p_{l\_thre}$ and $p_{u\_thre}$), which enables the determination as to whether or not a deviation has occurred between the frame images $f_t^{3a}$ and $f_t^{3b}$ with higher accuracy as compared to when the determination is made using one threshold value.

Next, the deviation determination unit 511 further applies information at a different time (for example, information at time t−1 which is prior to time t) to determine whether or not a deviation has occurred between the frame images $f_t^{3a}$ and $f_t^{3b}$ upon determining that the state is uncertain. That is, the deviation determination unit 511 determines whether or not a deviation has occurred between the frame images $f_t^{3a}$ and $f_t^{3b}$ based on the frame images $f_t^{3a}$ and $f_t^{3b}$ and the frame images $f_{t-1}^{3a}$ and $f_{t-1}^{3b}$ input from the wireless receiving device 4 upon determining that it is an uncertain state. By using not only the information at the same time (for example, the information at time t) but also the information at a different time, the deviation determination unit 511 can determine whether or not a deviation has occurred between the frame images $f_t^{3a}$ and $f_t^{3b}$ with high accuracy even in an uncertain state.

For example, the deviation determination unit 511 determines whether or not a deviation has occurred between the frame images $f_t^{3a}$ and $f_t^{3b}$ using a known image analysis technique that uses optical flow or the like. That is, the deviation determination unit 511 determines whether or not a deviation has occurred between the frame images $f_t^{3a}$ and $f_t^{3b}$ based on the amount of movement of a predetermined pixel (a first pixel) included in the frame image $f_{t-1}^{3a}$ with respect to the frame image $f_t^{3a}$ and the amount of movement of a predetermined pixel (a second pixel) included in the frame image $f_{t-1}^{3b}$ with respect to the frame image $f_t^{3b}$.

The deviation determination unit 511 calculates an optical flow vector $o_t^{3a}$ (a first optical flow vector) that connects the pixel value of the predetermined pixel included in the frame image $f_{t-1}^{3a}$ and the pixel value of a pixel corresponding to the predetermined pixel included in the frame image $f_t^{3a}$. The pixel value of the pixel corresponding to the predetermined pixel included in the frame image $f_t^{3a}$ refers to the pixel value of a pixel included in the frame image $f_t^{3a}$ at which the predetermined pixel included in the frame image $f_{t-1}^{3a}$ is located after Δt (duration between times t−1 and t). Also, the deviation determination unit 511 calculates an optical flow vector $o_t^{3b}$ (a second optical flow vector) that connects the pixel value of the predetermined pixel included in the frame image $f_{t-1}^{3b}$ and the pixel value of a pixel corresponding to the predetermined pixel included in the frame image $f_t^{3b}$. The pixel value of the pixel corresponding to the predetermined pixel included in the frame image $f_t^{3b}$ refers to the pixel value of a pixel included in the frame image $f_t^{3b}$ at which the predetermined pixel included in the frame image $f_{t-1}^{3b}$ is located after Δt (duration between times t−1 and t).

The deviation determination unit 511 determines whether or not the sum of the average value A and a determination function O which is based on the optical flow vectors $o_t^{3a}$ and $o_t^{3b}$ is greater than a third threshold value $p_{f\_thre}$ using the following expression (3).

[Math. 3]

$$\sum \frac{(p_{t,i}^{3b} - p_{t,i}^{3a})}{N} + O(o_t^{3a}, o_t^{3b}) > p_{f\_thre} \quad (3)$$

When the sum of the average value A and the determination function O is equal to or less than the third threshold value $p_{f\_thre}$, the deviation determination unit 511 determines that no deviation has occurred between the frame images $f_t^{3a}$ and $f_t^{3b}$. When the sum of the average value A and the determination function O is greater than the third threshold value $p_{f\_thre}$, the deviation determination unit 511 determines that a deviation has occurred between the frame images $f_t^{3a}$ and $f_t^{3b}$. The third threshold value $p_{f\_thre}$ is a preset threshold value for determining that no deviation has occurred between the frame images $f_t^{3a}$ and $f_t^{3b}$. The third threshold value $p_{f\_thre}$ is an arbitrarily set value.

The first term on the left side of the expression (3) represents the average value A. That is, the first term represents the degree of deviation in the space (image plane) between the frame images $f_t^{3a}$ and $f_t^{3b}$ which is based on the frame images $f_t^{3a}$ and $f_t^{3b}$ at the same time (for example, time t).

The second term on the left side of the expression (3) represents the determination function O. That is, the second term represents the degree of deviation in the space (image plane) between the frame images $f_t^{3a}$ and $f_t^{3b}$ which is based on the frame images $f_t^{3a}$ and $f_t^{3b}$ and $f_{t-1}^{3a}$ and $f_{t-1}^{3b}$ at different times (for example, time t and time t−1 which is prior to time t).

Here, the determination function O can be represented by the following equation (4).

[Math. 4]

$$O(o_t^{3a}, o_t^{3b}) = \frac{\beta}{|o_t^{3a} - o_t^{3b}| + \alpha} \quad (4)$$

Here, α represents an adjustment value for adjusting the value of the determination function O to prevent it from becoming infinite when the optical flow vectors $o_t^{3a}$ and $o_t^{3b}$ are exactly the same (the directions and the magnitudes of the vectors are the same).

β represents an adjustment value for adjusting how much importance is to be given to each of the first and second terms on the left side of the expression (3).

$|o_t^{3a}-o_t^{3b}|$ represents the absolute value of the difference between the optical flow vectors $o_t^{3a}$ and $o_t^{3b}$. The absolute value of the difference between the optical flow vectors $o_t^{3a}$ and $o_t^{3b}$ is the minimum value when the two optical flow vectors $o_t^{3a}$ and $o_t^{3b}$ have the same direction and the same magnitude.

The present embodiment has been described with reference to the case where the deviation determination unit 511 determines whether or not a deviation has occurred between the frame images $f_t^{3a}$ and $f_t^{3b}$ using the determination function O shown in the equation (4) upon determining that it is an uncertain state as an example, but the present invention is not limited to this. For example, the deviation determination unit 511 may employ a determination algorithm for camera shake correction that is generally used in commercially available digital cameras and the like.

As described above, first, the deviation determination unit 511 makes the following determination based on the overlapping images $d_t^{3a}$ and $d_t^{3b}$ at the same time (for example, time t). The "following determination" refers to a determination as to whether the state is uncertain, a deviation has occurred between the frame images $f_t^{3a}$ and $f_t^{3b}$, or no deviation has occurred between the frame images $f_t^{3a}$ and $f_t^{3b}$. Next, when the state is uncertain, the deviation determination unit 511 determines whether or not a deviation has occurred between the frame images $f_t^{3a}$ and $f_t^{3b}$ based on the frame images $f_t^{3a}$, $f_t^{3b}$, $f_{t-1}^{3a}$, and $f_{t-1}^{3b}$ at different times (for example, time t and time t−1 which is prior to time t). Thus, the deviation determination unit 511 can make a high-speed and highly accurate determination when it is an uncertain state. Further, the deviation determination unit 511 can make a highly accurate determination even in an uncertain state.

When the determination result input from the deviation determination unit 511 is that a deviation has occurred between the frame images $f_t^{3a}$ and $f_t^{3b}$, the correction value calculation unit 512 calculates the amount of deviation of the frame image $f_t^{3b}$ with respect to the frame image $f_t^{3a}$. Then, the correction value calculation unit 512 calculates correction values $C_t^{3a}$ and $C_t^{3b}$ for correcting the frame images $f_t^{3a}$ and $f_t^{3b}$ based on the amount of deviation of the frame image $f_t^{3b}$ with respect to the frame image $f_t^{3a}$. The correction value calculation unit 512 outputs the calculated correction values $C_t^{3a}$ and $C_t^{3b}$ to the frame image correction unit 52.

On the other hand, when the determination result input from the deviation determination unit 511 is that no deviation has occurred between the frame images $f_t^{3a}$ and $f_t^{3b}$, the correction value calculation unit 512 does not calculate the amount of deviation of the frame image $f_t^{3b}$ with respect to the frame image $f_t^{3a}$ (calculates the amount of deviation of the frame image $f_t^{3b}$ with respect to the frame image $f_t^{3a}$ as zero). The correction value calculation unit 512 does not calculate the correction values when the amount of deviation of the frame image $f_t^{3b}$ with respect to the frame image $f_t^{3a}$ is zero.

The amount of deviation refers to a vector representing a difference between the frame images including the number of pixels in which a deviation has occurred and the direction in which a deviation has occurred. The correction values each refer to a value used to correct the amount of deviation, the value being different from the amount of deviation. For example, when the amount of deviation refers to a vector representing a difference between images indicating that one image is "1 pixel to the right" of another image, the correction value refers to a value for returning the one image "1 pixel to the left" of the other image.

For example, the correction value calculation unit 512 applies a technique such as template matching to the overlapping images $d_t^{3a}$ and $d_t^{3b}$ to calculate the amount of deviation of the frame image $f_t^{3b}$ with respect to the frame image $f_t^{3a}$. Similar to when the deviation determination unit 511 makes a determination, the correction value calculation unit 512 may not be able to calculate the amount of deviation of the frame image $f_t^{3b}$ with respect to the frame image $f_t^{3a}$ because the overlapping images $d_t^{3a}$ and $d_t^{3b}$ alone are insufficient for a required absolute amount of pixels (amount of information).

Such a situation can be determined, for example, using determination formulas (5) and (6).

[Math. 5]

$$d_{1_{thre}} > |D(d_t^{3a}, d_t^{3b})| \tag{5}$$

[Math. 6]

$$|D(d_t^{3a}, d_t^{3b})| > d_{u_{thre}} \tag{6}$$

Here, D indicates a function for obtaining the amount of deviation, $D(d_t^{3a}-d_t^{3b})$ indicates the amount of deviation of the overlapping images $d_t^{3a}-d_t^{3b}$, and $|D(o_t^{3a}-o_t^{3b})|$ indicates the magnitude of the amount of deviation. $D_{1_{thre}}$ indicates a predetermined third threshold value for determining that the amount of deviation is smaller than assumed and $D_{u_{thre}}$ indicates a predetermined fourth threshold value for determining that the amount of deviation is greater than assumed. Determination formula (5) determines that the amount of deviation is smaller than assumed and cannot be calculated correctly. This indicates, for example, a situation in which the obtained amount of deviation is close to 0 even though the deviation determination unit has determined that a deviation has occurred. Determination formula (6) determines that the amount of deviation is greater than assumed and cannot be calculated correctly. Even if a deviation has occurred between frame images of the cameras, it is unlikely that the frame images will deviate significantly to a value that is physically difficult to conceive and thus such an amount of deviation is regarded as uncalculable.

In this case, the correction value calculation unit 512 calculates the amount of deviation of the frame image $f_t^{3b}$ with respect to the frame image $f_t^{3a}$ using pixels (information) of the entire frame images including the overlapping images $d_t^{3a}$ and $d_t^{3b}$. For example, the correction value calculation unit 512 calculates the following two optical flow vectors using a known image analysis technique that uses optical flow or the like. The first is an optical flow vector $O_t^{3a}$ of the frame image $f_t^{3a}$ with respect to the corrected frame image $f_{t-1}^{3a'}$ at time t−1. The second is an optical flow vector $O_t^{3b}$ of the frame image $f_t^{3b}$ with respect to the corrected frame image $f_{t-1}^{3b'}$ at time t−1. Then, the correction value calculation unit 512 calculates the amount of deviation of the frame image $f_t^{3b}$ with respect to the frame image $f_t^{3a}$ using the difference between the optical flow vectors $O_t^{3a}$ and $O_t^{3b}$. Compared to calculation of the amount of deviation of the frame image $f_t^{3b}$ with respect to the frame image $f_t^{3a}$ using only the overlapping images $d_t^{3a}$ and $d_t^{3b}$, calculation of the amount of deviation of the frame image $f_t^{3b}$ with respect to the frame image $f_t^{3a}$ using the entire frame image can increase the calculation accuracy. This is because more pixels (information) can be used to calculate the amount of deviation of the frame image $f_t^{3b}$ with respect to the frame image $f_t^{3a}$.

The frame image correction unit 52 corrects the frame images $f_t^{3a}$ and $f_t^{3b}$ based on the correction values $C_t^{3a}$ and $C_t^{3b}$ input from the frame image correction unit 52. The frame image correction unit 52 generates and outputs a corrected frame image $f_t^{3a\prime}$ and a corrected frame image $f_t^{3b\prime}$ to the frame image synthesis unit 53.

The frame image synthesis unit 53 synthesizes the corrected frame image $f_t^{3a\prime}$ input from the frame image correction unit 52 and the corrected frame image $f_t^{3b\prime}$ input from the frame image correction unit 52. The frame image synthesis unit 53 outputs an image into which the corrected frame images $f_t^{3a\prime}$ and $f_t^{3b\prime}$ have been synthesized to the display device 6.

The display device 6 includes a frame image display unit 61. The frame image display unit 61 displays the image into which the corrected frame images $f_t^{3a\prime}$ and $f_t^{3b\prime}$ have been synthesized.

In the panoramic image synthesis system 1 according to the present embodiment, a deviation between frame images captured by the plurality of cameras 3a and 3b which has occurred due to vibrations of the unmanned aerial vehicle 2 is detected with high accuracy. Thus, correction values for eliminating the deviation between the frame images can be calculated with high accuracy, such that a highly accurate panoramic image can be generated without firmly fixing the plurality of cameras 3a and 3b.

Image Processing Method

Figure 4:
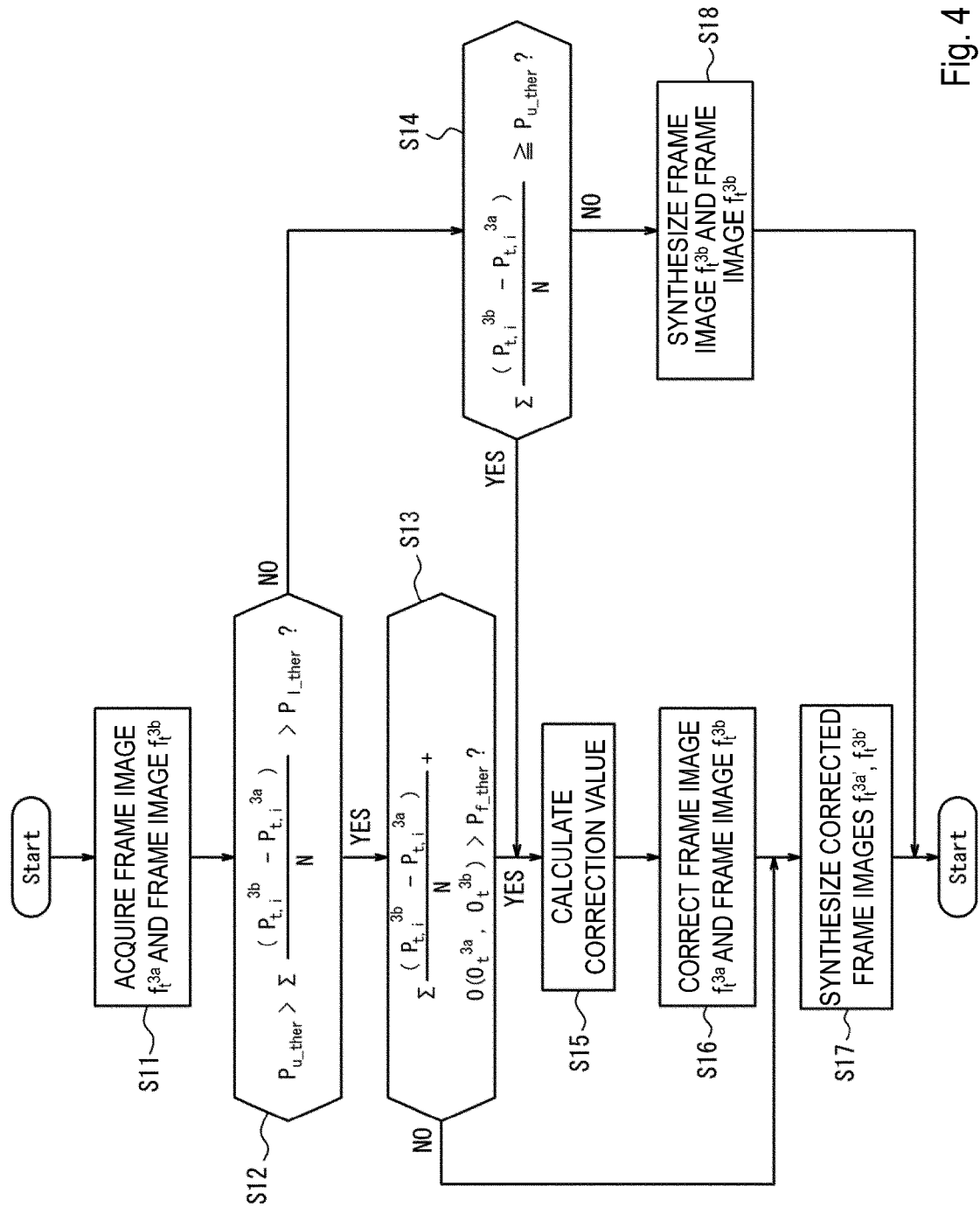
FIG. 4 is a flowchart for explaining an image processing method according to an embodiment of the present invention.

Next, an image processing method according to an embodiment of the present invention will be described with reference to a flowchart illustrated in FIG. 4.

Step S11: The frame image receiving unit 41 acquires a frame image $f_t^{3a}$ captured by the camera 3a and a frame image $f_t^{3b}$ captured by the camera 3b at time t.

Step S12: The deviation determination unit 511 determines whether or not an average value A of differences between the pixel values of corresponding pixels in overlapping images $d_t^{3a}$ and $d_t^{3b}$ of the frame images $f_t^{3a}$ and $f_t^{3b}$ is greater than the first threshold value $p_{u\_thre}$ and smaller than the second threshold value $p_{u\_thre}$. When the average value A is greater than the first threshold value $p_{1\_thre}$ and smaller than the second threshold value $p_{u\_thre}$, the deviation determination unit 511 performs the process of step S13. When the average value A is equal to or less than the first threshold value $p_{1\_thre}$ or equal to or greater than the second threshold value $p_{u\_thre}$, the deviation determination unit 511 performs the process of step S14.

Step S13: The deviation determination unit 511 determines whether or not the sum of the average value A and the determination function O is greater than the third threshold value $p_{f\_thre}$. When the sum of the average value A and the determination function O is greater than the third threshold value $p_{f\_thre}$, the deviation determination unit 511 performs the process of step S15. When the sum of the average value A and the determination function O is equal to or less than the third threshold value $p_{f\_thre}$, the deviation determination unit 511 performs the process of step S17.

Step S14: The deviation determination unit 511 determines whether or not the average value A of the differences between the pixel values of corresponding pixels in the overlapping images $d_t^{3a}$ and $d_t^{3b}$ of the frame images $f_t^{3a}$ and $f_t^{3b}$ is equal to or greater than the second threshold value $p_{u\_thre}$. When the average value A is equal to or greater than the second threshold value $p_{u\_thre}$, the deviation determination unit 511 performs the process of step S15. When the average value A is smaller than the second threshold value $p_{u\_thre}$, the deviation determination unit 511 performs the process of step S18.

Step S15: The correction value calculation unit 512 calculates correction values $C_t^{3a}$ and $C_t^{3b}$ for correcting the frame images $f_t^{3a}$ and $f_t^{3b}$ based on the amount of deviation of the frame image $f_t^{3b}$ with respect to the frame image $f_t^{3a}$.

Step S16: The frame image correction unit 52 corrects the frame images $f_t^{3a}$ and $f_t^{3b}$ based on the correction values $C_t^{3a}$ and $C_t^{3b}$ to generate corrected frame images $f_t^{3a\prime}$ and $f_t^{3b\prime}$.

Step S17: The frame image synthesis unit 53 synthesizes the corrected frame images $f_t^{3a\prime}$ and $f_t^{3b\prime}$.

Step S18: The frame image synthesis unit 53 synthesizes the frame images $f_t^{3a}$ and $f_t^{3b}$.

As described above, the image processing method according to the present embodiment includes an acquisition step, a determination step, a calculation step, a correction step, and a synthesis step. The acquisition step acquires a frame image captured by the camera 3a and a frame image captured by the camera 3b. The determination step makes the following determination when an average value A of differences between the pixel values of corresponding pixels in overlapping images $d_t^{3a}$ and $d_t^{3b}$ of the frame images $f_t^{3a}$ and $f_t^{3b}$ is greater than the first threshold value $p_{1\_thre}$ and smaller than the second threshold value $p_{u\_thre}$. The "following determination" refers to a determination as to whether or not a deviation has occurred between the frame images $f_t^{3a}$ and $f_t^{3b}$ based on the average value A and the following images. The "following images" refer to frame images $f_t^{3a}$ and $f_t^{3b}$ and frame images $f_{t-1}^{3a}$ and $f_{t-1}^{3b}$. The calculation step calculates, when a deviation has occurred between the frame images $f_t^{3a}$ and $f_t^{3b}$, correction values $C_t^{3a}$ and $C_t^{3b}$ based on the amount of deviation of the frame image $f_t^{3b}$ with respect to the frame image $f_t^{3a}$. The correction step corrects the frame images $f_t^{3a}$ and $f_t^{3b}$ based on the correction values $C_t^{3a}$ and $C_t^{3b}$. The synthesis step synthesizes the corrected frame images $f_t^{3a\prime}$ and $f_t^{3b\prime}$.

In the image processing method according to the present embodiment, first, whether or not a deviation has occurred between the frame images $f_t^{3a}$ and $f_t^{3b}$ is determined based on the overlapping images $d_t^{3a}$ and $d_t^{3b}$ at the same time. Then, in the image processing method according to the present embodiment, when the state is uncertain, whether or not a deviation has occurred between the frame images $f_t^{3a}$ and $f_t^{3b}$ is determined based on the frame images $f_t^{3a}$ and $f_t^{3b}$ at the same time and the frame images $f_{t-1}^{3a}$ and $f_{t-1}^{3b}$ at a different time. Thus, whether or not a deviation has occurred between the frame images $f_t^{3a}$ and $f_t^{3b}$ can be determined with high accuracy, such that the correction values $C_t^{3a}$ and $C_t^{3b}$ for correcting the frame images $f_t^{3a}$ and $f_t^{3b}$ can be calculated with high accuracy. That is, an image processing method capable of generating a highly accurate panoramic image can be realized without firmly fixing the plurality of cameras 3a and 3b mounted on the unmanned aerial vehicle 2.

The processes performed by the computing device 5 described above may also be performed by the unmanned aerial vehicle 2.

Although not particularly mentioned in the embodiments, a program for executing each process performed by a computer functioning as the computing device 5 may be provided. The program may also be recorded on a computer-readable medium. A computer-readable medium can be used to install the program on a computer. Here, the computer-readable medium on which the program is recorded may be a non-transient recording medium.

The non-transient recording medium is not particularly limited, and may be, for example, a recording medium such as a CD-ROM or a DVD-ROM.

Although the above embodiments have been described as representative examples, it will be apparent to those skilled in the art that many modifications and substitutions are possible within the spirit and scope of the present invention. Thus, the present invention is not to be construed as limited by the embodiments described above and various modifications and changes can be made without departing from the scope of the claims. For example, a plurality of constituent blocks described in the configuration diagrams of the embodiments can be combined into one or one constituent block can be divided.

REFERENCE SIGNS LIST

1 Panoramic image synthesis system
2 Unmanned aerial vehicle
3a Camera (first camera)
3b Camera (second camera)
4 Wireless receiving device
5 Computing device (image processing apparatus)
6 Display device
21 Frame image acquisition unit
22 Frame image transmitting unit
41 Frame image receiving unit
51 Frame image correction value calculation unit
511 Deviation determination unit
512 Correction value calculation unit
52 Frame image correction unit
53 Frame image synthesis unit
61 Frame image display unit

The invention claimed is:

1. An image processing method of synthesizing frame images captured by a plurality of cameras mounted on an unmanned aerial vehicle, the image processing method comprising:
    acquiring a first frame image captured by a first camera of the plurality of cameras and a second frame image captured by a second camera of the plurality of cameras;
    determining whether or not a deviation has occurred between the first frame image at a first time and the second frame image at the first time based on a difference between the first frame image at the first time and the second frame image at the first time;
    calculating a correction value based on an amount of deviation of the second frame image at the first time with respect to the first frame image at the first time when it has been determined in the determining that the deviation has occurred;
    correcting the first frame image and the second frame image at the first time based on the correction value; and
    synthesizing the corrected first frame image and the corrected second frame image to generate a synthesized frame image corresponding to the first time.

2. The image processing method according to claim 1, wherein the determining includes, when whether or not there is a deviation is not able to be determined using a threshold value for the difference between the first frame image at the first time and the second frame image at the first time, determining whether or not the deviation has occurred based on the first frame image and the second frame image at the first time and the first frame image and the second frame image at a second time different from the first time.

3. The image processing method according to claim 1, wherein the calculating includes, upon determining that an amount of deviation expected to be present between the first frame image at the first time and the second frame image at the first time is not able to be correctly obtained using a threshold, calculating the amount of deviation of the second frame image at the first time with respect to the first frame image at the first time based on the first frame image and the second frame image at the first time and the first frame image and the second frame image at a second time different from the first time.

4. The image processing method according to claim 1, wherein the amount of deviation includes a vector comprising:
    a difference in pixels of the deviation between the first image frame and the second image frame, and
    a direction of the deviation.

5. The image processing method according to claim 1, wherein the correction value includes a vector comprising a number of pixels for correcting the deviation and a direction for correcting the deviation, and wherein the correction value is distinct from the amount of deviation.

6. The image processing method according to claim 1, wherein the first camera and the second camera are mounted at distinct locations and aimed at distinct directions on the unmanned aerial vehicle.

7. The image processing method according to claim 1, wherein the synthesized frame image represents a panorama image based on the first frame image and the second frame image.

8. An image processing apparatus comprising:
    a processor configured to execute operations for synthesizing frame images captured by a plurality of cameras mounted on an unmanned aerial vehicle, the operations comprising:
        determining whether or not a deviation has occurred between a first frame image captured by a first camera of the plurality of cameras at a first time and a second frame image captured by a second camera of the plurality of cameras at the first time based on a difference between the first frame image at the first time and the second frame image at the first time;
        calculating a correction value based on an amount of deviation of the second frame image at the first time with respect to the first frame image at the first time when the deviation determiner has determined that the deviation has occurred;
        correcting the first frame image and the second frame image at the first time based on the correction value; and
        synthesizing the corrected first frame image and the corrected second frame image to generate a synthesized frame image corresponding to the first time.

9. The image processing apparatus according to claim 8, wherein the determining further comprises, when whether or not there is a deviation is not able to be determined using a threshold value for the difference between the first frame image at the first time and the second frame image at the first time, determining whether or not the deviation has occurred based on the first frame image and the second frame image at the first time and the first frame image and the second frame image at a second time different from the first time.

10. The image processing apparatus according to claim 8, wherein the calculating the correction value further comprises, when an amount of deviation expected to be present between the first frame image at the first time and the second frame image at the first time is unobtainable based on a threshold, calculating the amount of deviation of the second frame image at the first time with respect to the first frame image at the first time based on the first frame image and the second frame image at the first time and the first frame image and the second frame image at a second time different from the first time.

11. The image processing apparatus according to claim 8, wherein the amount of deviation includes a vector comprising:
a difference in pixels of the deviation between the first image frame and the second image frame, and
a direction of the deviation.

12. The image processing apparatus according to claim 8, wherein the correction value includes a vector comprising a number of pixels for correcting the deviation and a direction for correcting the deviation, and wherein the correction value is distinct from the amount of deviation.

13. The image processing apparatus according to claim 8, wherein the first camera and the second camera are mounted at distinct locations and aimed at distinct directions on the unmanned aerial vehicle.

14. The image processing apparatus according to claim 8, wherein the synthesized frame image represents a panorama image based on the first frame image and the second frame image.

15. An image processing system comprising:
a processor configured to execute operations for synthesizing frame images captured by a plurality of cameras mounted on an unmanned aerial vehicle, the operations comprising:
receiving a first frame image captured by a first camera of the plurality of cameras and a second frame image captured by a second camera of the plurality of cameras;
determining whether or not a deviation has occurred between the first frame image at a first time and the second frame image at the first time based on a difference between the first frame image at the first time and the second frame image at the first time;
calculating a correction value based on an amount of deviation of the second frame image at the first time with respect to the first frame image at the first time when the deviation determiner has determined that the deviation has occurred;
correcting the first frame image and the second frame image at the first time based on the correction value; and
synthesizing the corrected first frame image and the corrected second frame image to generate a synthesized frame image corresponding to the first time.

16. The image processing system according to claim 15, wherein the determining further comprises, when whether or not there is a deviation is not able to be determined using a threshold value for the difference between the first frame image at the first time and the second frame image at the first time, determining whether or not the deviation has occurred based on the first frame image and the second frame image at the first time and the first frame image and the second frame image at a second time different from the first time.

17. The image processing system according to claim 15, wherein the calculating the correction value further comprises, when an amount of deviation expected to be present between the first frame image at the first time and the second frame image at the first time is unobtainable based on a threshold, calculating the amount of deviation of the second frame image at the first time with respect to the first frame image at the first time based on the first frame image and the second frame image at the first time and the first frame image and the second frame image at a second time different from the first time.

18. The image processing system according to claim 15, wherein the amount of deviation includes a vector comprising:
a difference in pixels of the deviation between the first image frame and the second image frame, and
a direction of the deviation.

19. The image processing system according to claim 15, wherein the correction value includes a vector comprising a number of pixels for correcting the deviation and a direction for correcting the deviation, and wherein the correction value is distinct from the amount of deviation.

20. The image processing system according to claim 15, wherein the first camera and the second camera are mounted at distinct locations and aimed at distinct directions on the unmanned aerial vehicle, and
wherein the synthesized frame image represents a panorama image based on the first frame image and the second frame image.

* * * * *